United States Patent [19]
Kubicek et al.

[11] Patent Number: 5,141,904
[45] Date of Patent: Aug. 25, 1992

[54] REACTIVATION OF SPENT CRACKING CATALYSTS

[75] Inventors: Donald H. Kubicek; Chia-Min Fu, both of Bartlesville, Okla.; Richard E. Lowery, Muscatine, Iowa; Michael K. Maholland, Bartlesville, Okla.

[73] Assignee: Phillips Petroleum Company, Bartlesville, Okla.

[21] Appl. No.: 657,016

[22] Filed: Feb. 15, 1991

[51] Int. Cl.$^5$ .............................. B01J 38/62
[52] U.S. Cl. .................... 502/28; 502/516; 502/521; 208/52 CT
[58] Field of Search .............. 502/28, 516, 521; 208/52 CT

[56] References Cited

U.S. PATENT DOCUMENTS

| | | | |
|---|---|---|---|
| 3,147,209 | 9/1964 | Erickson | 208/120 |
| 3,147,228 | 9/1964 | Erickson | 252/412 |
| 3,168,462 | 2/1965 | Erickson | 208/120 |
| 3,173,882 | 3/1965 | Anderson | 252/413 |
| 3,252,918 | 5/1966 | Disegna et al. | 252/416 |
| 3,255,102 | 6/1966 | Sanford et al. | 208/120 |
| 3,383,169 | 5/1968 | Young | 23/112 |
| 3,493,490 | 2/1970 | Plank et al. | 208/120 |
| 3,499,846 | 3/1970 | Michalko | 252/451 |
| 3,533,959 | 10/1970 | Miale et al. | 252/414 |
| 3,551,353 | 12/1970 | Chen et al. | 252/455 |
| 3,977,963 | 8/1976 | Readal et al. | 208/120 |
| 4,163,709 | 8/1979 | Burk et al. | 208/120 |
| 4,163,710 | 8/1979 | Burk et al. | 208/120 |
| 4,218,337 | 8/1980 | McKay | 252/411 R |
| 4,234,452 | 11/1980 | Burk, Jr. et al. | 502/27 |
| 4,243,550 | 1/1981 | Burk et al. | 252/412 |
| 4,256,564 | 3/1981 | Roberts et al. | 208/120 |
| 4,280,897 | 7/1981 | Shah et al. | 208/113 |
| 4,321,128 | 3/1982 | Yoo | 208/114 |
| 4,321,129 | 3/1982 | Bertus et al. | 208/120 |
| 4,595,666 | 6/1986 | Gangvli | 502/25 |
| 4,686,197 | 8/1987 | Elvin | 502/22 |
| 4,714,688 | 12/1987 | Dinh et al. | 502/33 |
| 4,800,185 | 1/1989 | Elvin et al. | 502/26 |
| 4,814,066 | 3/1989 | Fu | 208/120 |
| 4,824,814 | 4/1989 | Elvin et al. | 502/22 |
| 4,830,997 | 5/1989 | Trinh et al. | 502/28 |
| 4,929,336 | 5/1990 | Lowery et al. | 208/120 |
| 4,935,121 | 6/1990 | Fu et al. | 208/120 |
| 4,954,244 | 9/1990 | Fu et al. | 208/120 |
| 5,021,377 | 6/1991 | Maholland et al. | 502/26 |

OTHER PUBLICATIONS

"Demetalation Chemistry: Control of Vanadium on Fluid Cracking Catalyst", by Jin S. Yoo et al., Ind. Eng. Chem. Res. 1990, 29, 1183-1189.

"Technique for Removing Metal Contaminants From Catalysts", by Harold Benther et al., I&EC Product Research and Development vol. 2, No. 1, Mar. 1963, pp. 53-57.

Primary Examiner—Theodore Morris
Assistant Examiner—William C. Diemler
Attorney, Agent, or Firm—K. K. Brandes

[57] ABSTRACT

A spent metal contaminated zeolite-containing catalytic cracking catalyst composition is reactivated by a process which comprises contacting with an aqueous solution of at least one carboxylic acid (preferably at least one of formic acid, acetic acid, citric acid and lactic acid). The thus reactivated catalyst composition can be employed in a catalytic cracking process.

36 Claims, No Drawings

REACTIVATION OF SPENT CRACKING CATALYSTS

BACKGROUND OF THE INVENTION

This invention relates to a method of reactivating spent, metal-contaminated zeolite-containing catalytic cracking catalysts. In another aspect, this invention relates to a catalytic cracking process employing a reactivated spent catalytic cracking catalyst.

Various methods of rejuvenating deactivated, metal-contaminated zeolite-containing catalytic cracking catalysts are known, such as treatment with ammonium compounds and fluorine compounds, described in U.S. Pat. No. 4,814,066. However, there is an ever present need to develop new, more effective and/or efficient catalyst reactivation processes.

SUMMARY OF THE INVENTION

It is an object of this invention to provide a process for treating a spent, metal-contaminated zeolite-containing catalytic cracking catalyst composition under such conditions as to enhance its catalytic cracking activity and/or reduce its capability of generating hydrogen during catalytic cracking. It is another object of this invention to provide a reactivated zeolite-containing catalytic cracking catalyst composition. It is another object of this invention to provide a catalytic cracking process employing a reactivated spent catalytic cracking catalyst composition. Other objects and advantages will become apparent from the detailed description of the invention and the appended claims.

According to this invention, a process for reactivating a spent cracking catalyst composition comprises the steps of:

(a) contacting a spent zeolite-containing catalytic cracking catalyst composition which contains at least one metal contaminant with an acid solution comprising (preferably consisting essentially of) water and at least one carboxylic acid;

(b) at least partially separating the acid-treated spent catalytic cracking catalyst composition obtained in step (a) from the aqueous solution used in step (a); and (c) drying the at least partially separated spent catalytic cracking catalyst composition obtained in step (b) (i.e., to substantially remove water from the at least partially separated spent catalytic cracking catalyst composition);

wherein said catalyst reactivation process is carried out under such conditions as to obtain a reactivated catalytic cracking catalyst composition having higher catalytic cracking activity (as measured by enhanced feed conversion and/or higher gasoline yield attained during catalytic cracking of a hydrocarbon-containing oil) than said spent zeolite-containing catalytic cracking catalyst composition.

Preferred carboxylic acids are saturated aliphatic or cycloaliphatic or aromatic carboxylic acids containing 1-4 (more preferably 1-2) carboxyl (—COOH) groups and a total number of 1-10 (more preferably 1-3) carbon atoms per molecule. Also preferred are hydroxy-substituted carboxylic acids containing 1-4 (more preferably 1-3) carboxyl groups, a total number of 2-12 (more preferably 3-6) carbon atoms per molecule, and 1-2 hydroxyl (—OH) groups attached to at least one hydrocarbyl (i.e., aliphatic or cycloaliphatic or aromatic) group. Presently more preferred are saturated aliphatic monocarboxylic acids and saturated aliphatic monohydroxy-substituted carboxylic acids.

In a preferred embodiment, the reactivation process of this invention comprises the additional step of treating the reactivated catalytic cracking catalyst composition obtained in the acid-treatment step described above with at least one antimony compound, under such conditions as to reduce the detrimental effect of the at least one metal contaminant (still contained in said reactivated catalytic cracking catalyst composition after the acid treatment step) during catalytic cracking, as measured by hydrogen generation in a test for catalytically cracking a heavy hydrocarbon-containing oil, carried out substantially in accordance with the procedure of Example II of U.S. Pat. No. 4,794,095.

Further in accordance with this invention, a catalytic cracking process is provided comprising the step of contacting a hydrocarbon-containing feed stream with a zeolite-containing cracking catalyst composition, under such catalytic cracking conditions as to obtain at least one normally liquid (i.e., liquid at 25° and 1 atm.) hydrocarbon-containing product stream having a lower initial boiling point and higher API gravity than said hydrocarbon-containing feed stream, wherein at least a portion of said zeolite-containing cracking catalyst composition is a reactivated spent catalytic cracking catalyst composition having been treated by the reactivation process of this invention (described above).

DETAILED DESCRIPTION OF THE INVENTION

The term "catalytic cracking", as used herein, implies that essentially no hydrocracking occurs and that the catalytic cracking process is carried out with a hydrocarbon-containing oil substantially in the absence of added hydrogen gas. The term "spent", as used herein, implies that at least a portion of the zeolite-containing catalyst composition employed in the reactivation process of this invention has previously been used in a process for catalytically cracking hydrocarbon-containing oils, in particular those containing metal (Ni, V, Cu) impurities, and has thereby lost some of its catalytic activity (i.e., its catalytic cracking activity before its use in the previous cracking process). The spent catalytic cracking catalyst composition has been regenerated by stripping of adhered oil from the catalyst (such as by steam-stripping) and subsequent heating in an oxidizing gas atmosphere (such as air) so as to burn off coke deposits on the spent catalyst composition, before the reactivation process of this invention comprising steps (a)-(c) is carried out.

Any spent zeolite-containing catalyst composition, which contains at least one metal contaminant and at least a portion of which has previously been used in a catalytic cracking process, can be used as starting material in the acid treatment step of the reactivation process of this invention. The spent catalyst composition can contain any portion of such regenerated catalyst composition, ranging from 100% to about 10 weight-% (i.e., containing 0% to about 90 weight-% fresh, unused zeolite-containing catalytic cracking catalyst composition). The term "spent catalyst composition" encompasses equilibrium cracking catalysts, which are commonly employed in commercial catalytic cracking operations and generally comprise a physical blend of regenerated used catalyst composition and fresh (unused) cracking catalyst composition. An equilibrium catalyst generally comprises a mixture of catalyst particles of various ages, i.e., a portion of the equilibrium catalyst particles has passed through a varying number of cracking and regeneration cycles, while a small portion of the equilibrium catalyst particles is fresh (unused) cracking catalyst composition.

The zeolite component of the spent zeolite-containing catalytic cracking catalyst composition of this invention can be any natural or synthetic crystalline aluminosilicate zeolite which exhibits cracking activity. Non-limiting examples of such zeolites are faujasite, chabazite, mordenite, offretite, erionite, Zeolon, zeolite X, zeolite Y, zeolite L, zeolite ZSM-4, zeolite ZSM-5, zeolite ZSM-11, zeolite ZSM-12, zeolite ZSM-23, zeolite ZSM-35, zeolite ZSM-38, zeolite ZSM-48, and the like, and mixtures thereof. Additional examples of suitable zeolites are listed in U.S. Pat. No. 4,158,621. The term "zeolite", as used herein, includes zeolites which have been pretreated, such as those from which a portion of Al has been removed from the crystalline framework, and zeolites which have been ion-exchanged with rare earth metal or ammonium or by other conventional ion-exchange methods. The term "zeolite", as used herein, also includes essentially aluminum-free silica polymorphs, such as silicalite, chromia silicates, ferrosilicates, borosilicates, and the like, as disclosed in U.S. Pat. No. 4,556,749.

Generally, the zeolite component of the spent cracking catalyst composition is dispersed in a suitable solid refractory inorganic matrix material, such as alumina, silica, silica-alumina (presently preferred), aluminum phosphate, magnesium oxide, mixtures of two or more of the above-listed materials, and the like. The preparation of such zeolite/matrix cracking catalyst compositions is well known and is not a critical feature of this invention. Generally, the surface area (measured by nitrogen adsorption, substantially in accordance with the BET method of Brunauer, Emmett and Teller) of the spent zeolite/matrix cracking catalyst composition used in step (a) is in the range of from about 100 to about 800 $m^2/g$. Generally, the weight ratio of zeolite to matrix material in the spent cracking catalyst composition is in the range of from about 1:20 to about 1:1.

The spent zeolite-containing cracking catalyst composition employed in the reactivation process of the invention contains metal compounds as contaminants (generally as oxides), such as compounds (particularly oxides) of Ni, V, Fe, and Cu, and the like, in particular Ni and V. Contaminants of each metal can generally be present in amounts ranging from traces (about 0.01 weight-%) to about 2.0 weight-% of each contaminant metal, expressed as metal oxide. These impurities in the spent cracking catalyst compositions have generally been absorbed from the oil feed in a previous cracking process. However, the origin of these metal impurities is not believed to be a critical feature of this invention. It is within the scope of this invention to use spent cracking catalysts from which at least a portion of contaminant metals (Ni, V, Cu) have been removed (e.g., by the demetallizing process of U.S. Pat. No. 4,686,197).

Any suitable carboxylic acid and/or hydroxy-substituted carboxylic acid which is at least partially soluble in water can be employed as solute of the aqueous contacting solution used in the catalyst reactivation process of the invention. Non-limiting examples of such acids are: formic acid, acetic acid, chloroacetic acid, di- and trichloroacetic acids, propionic acid, malonic acid, glutaric acid, succinic acid, adipic acid, pimelic acid, cyclohexanecarboxylic acid, benzoic acid, o-, m- and p-phthalic acids, hydroxyacetic acid, $\beta$-hydroxypropionic acid, lactic acid, citric acid, tartaric acid, salicylic acid, and mixtures thereof. Presently preferred are formic acid, acetic acid, citric acid and lactic acid. Also presently preferred are acid solutions consisting essentially of water and at least one carboxylic acid.

The aqueous contacting solution can contain one or more of the above-described acids at any effective concentration, preferably about 0.001 to about 10 mol/l, more preferably about to about 0.5 to about 10 mol/l. The pH of the aqueous contacting solution generally is below about 3, preferably about 0.5–2.

The contacting of the spent zeolite-containing catalyst composition and the aqueous solution containing at least one carboxylic acid and/or hydroxy-substituted carboxylic acid can be carried out in any suitable manner. It can be done as a batch process in a vessel, preferably with agitation. Or it can be done continuously, such as by passing the aqueous solution comprising at least one of the above-described acids through a column filled with a spent cracking catalyst composition. Any suitable time of contact between solution and spent cracking catalyst composition can be employed, generally from about 0.05 to about 5 hours (preferably about 5–30 minutes). Any suitable temperature can be employed in this contacting step generally from about 10° C. to about 100° C. (preferably about 60°–90° C.), generally at ambient pressure (1 atm). Generally, the weight ratio of the aqueous contacting solution to the spent cracking catalyst is in the range of from about 2:1 to about 100:1; preferably about 4:1 to about 20:1.

The thus-reactivated catalyst composition is at least partially (preferably substantially) separated from the aqueous treating solution. Any suitable separating means can be employed. Non-limiting examples of suitable solid/liquid separation means are filtration, centrifugation, settling and subsequent draining or decantation of the liquid, and the like.

Optionally, the at least partially separated acid-treated catalyst composition is washed with a suitable liquid (preferably water). Generally, the temperature of the wash liquid (preferably water) is about 100°–212° F., preferably about 180°–210° F. This washing step may enhance the removal of contaminant metals (in particular vanadium) from the catalytic cracking catalyst composition. Preferred washing conditions can easily be determined by those skilled in the art.

The at least partially separated treated catalyst composition is dried in step (c), so as to substantially remove adhered water therefrom. Any effective drying conditions can be employed. Preferred drying conditions comprise a temperature of about 80°–120° C., at atmospheric pressure conditions, and a drying time of about 0.5–10 hours.

In a preferred embodiment, an additional metals passivating step (d) is carried out by treating the acid-treated spent catalyst composition with at least one antimony compound. The term "metals passivating", as used herein, implies that the detrimental effect of generating $H_2$ during catalytic cracking caused by metal deposits (such as Ni, V and Cu) on a cracking catalyst composition has been mitigated. Non-limiting examples of suitable Sb compounds are described in various patents (e.g., U.S. Pat. Nos. 3,711,422, 4,025,458, 4,190,522, 4,193,891 and 4,263,131). Preferred antimony components are antimony tris(0,0-dihydrocarbyl) phosphorodithioates, antimony oxides (more preferably Sb$_2$O$_5$), antimony carboxylates, antimony mercaptides, antimony fluoride and mixtures thereof.

In this additional metals passivating step, the acid-treated spent cracking catalyst composition is contacted (generally impregnated or sprayed) with a solution or, alternatively, a dispersion of at least one antimony compound in a suitable liquid medium (such as water) so as to incorporate into the acid-treated spent catalyst composition an effective passivating amount of antimony. Any effective concentration of the passivating agent in the solution or dispersion can be applied (preferably about 0.01–0.5 mol/l Sb). Any suitable weight ratio of the antimony compound(s) to the acid-treated spent cracking catalyst composition can be applied in this metals passivating step. Generally, this weight ratio is in the range of from about 0.00001:1 to about 0.5:1, preferably in the range of from about 0.001:1 to about 0.02:1. Generally, this additional metals passivating step is carried out at any suitable temperature, preferably, at a temperature of about 10 to about 95° C.

Preferably, the additional metals passivating step (d) is followed by another drying step (preferably in air or an inert gas such as N$_2$, for about 0.2–10 hours, at a temperature of about 100° to about 150° C.). The drying step may be followed by an additional calcining step (preferably at a temperature of about 450° to about 750° C., for about 0.2–10 hours, in air or an inert gas such as N$_2$). In the calcining step, the applied antimony compound is substantially converted to an oxide (e.g., Sb$_2$O$_3$ and/or Sb$_2$O$_5$).

Any suitable effective total level of antimony in the acid-treated spent catalytic cracking catalyst composition can be attained. Generally, this level is in the range of from about 0.01 to about 5 weight-% Sb, based on the weight of the substantially dry material. Preferably, this level is about 0.02–2 weight-% Sb.

In a further preferred embodiment, an additional metals passivating step (d*) is carried out, in lieu of step (d), with a solution comprising at least one passivating agent other than antimony compound(s), herein referred to as "alternate passivating agent(s)". However, while antimony compounds are effectively used as passivating agents in step (d) in conjunction with any carboxylic acid employed in step (a), the alternate passivating agents are effective (especially in terms of further reduction in H$_2$ generation during catalytic cracking) only when specific carboxylic acids are employed in step (a). When acetic acid is employed in step (a), the at least one alternate passivating agent used in step (d*) is at least one tin compound. When lactic acid is employed in step (a), the at least one alternate passivating agent used in step (d*) is selected from the group consisting of compounds of bismuth and compounds of phorphorus. When citric acid is employed in step (a), the at least one alternate passivating agent used in step (d*) is selected from the group consisting of compounds of bismuth, compounds of indium, compounds of phosphorus, compounds of tellurium and compounds of tin. It is within the scope of this invention (yet presently not preferred) to have antimony compound(s) present besides the specific alternate passivating agent(s) in step (d*), or to carry out step (d*) after step (d), or vice versa.

Non-limiting examples of suitable alternate passivating agents have been described in the patent literature, such as U.S. Pat. Nos. 3,977,963 (Bi compounds), 4,218,337 (Te compounds), 4,256,564 (In compounds), 4,321,128 (P compounds) and 4,321,129 (Sn compounds), the disclosures of which are herein incorporated by reference. Presently preferred alternate passivating agents include: bismuth carboxylates, indium nitrate or sulfates or halides, tellurium halides, tetraalkyltin, tin halides or carboxylates, alkyl or aryl phosphines, phosphoric acid and ammonium hydrogen phosphates. Depending on the solubility and stability of a particular passivating agent in solution, water or organic solvents are employed for preparing the solutions employed in step (d*). Specific examples of alternate passivating agents are listed in Example V.

The conditions of the additional metals passivating step (d*) are essentially the same as those described for step (d), except that antimony (whenever referred to) is to be replaced with bismuth or indium or phosphorus or tellurium or tin. Preferably, step (d*) is followed by another drying step and, optionally, a calcining step, wherein the conditions of these steps are essentially the same as in those above-described steps following step (d). Generally, the level of the alternate passivating element is about 0.01 to about 5, preferably about 0.02–2, weight-% (of Bi or In or P or Sn or Te).

The reactivated cracking catalyst composition obtained in the above-described reactivation process of this invention can be used in any catalytic cracking process, i.e., a process for catalytically cracking hydrocarbon-containing oil feedstocks, in any suitable cracking reactor (e.g., in a FCC reactor or in a Thermofor moving bed reactor), essentially in the absence of added hydrogen gas. The reactivated catalyst composition obtained in the above-described steps can be used alone or in admixture with fresh (unused) zeolite-containing catalyst composition in catalytic cracking processes.

The hydrocarbon-containing feed stream for the catalytic cracking process of this invention can be any suitable feedstock. Generally the feed has an initial boiling point (ASTM D 1160) in excess of about 400° F., preferably a boiling range of from about 400° to about 1200° F., more preferably a range of from about 500° to about 1100° F., measured at atmospheric pressure conditions. The API gravity (measured at 60° F.) generally is in the range of from about 5 to about 40, preferably from about 10 to about 35. Generally, these feedstocks contain Ramsbottom carbon residue (ASTM D 524; usually about 0.1–20 weight-%), sulfur (generally about 0.1–5 weight-% S), nitrogen (generally about 0.05–2 weight-% N), nickel (generally about 0.05–30 ppm Ni, i.e., parts by weight of Ni per million parts by weight of feed), vanadium (generally about 0.1–50 ppm V) and copper (generally about 0.01–30 ppm Cu). Non-limiting examples of suitable feedstocks are light gas oils, heavy gas oils, vacuum gas oils, cracker recycle oils (cycle oils), residua (such as distillation bottoms fractions), and hydrotreated residua (e.g., hydrotreated in the presence of Ni, Co, Mo-promoted alumina catalysts), liquid coal pyrolyzates, liquid products from extraction or pyrolysis of tar sand, shale oils, heavy fractions of shale oils, and the like. The presently most preferred feedstocks are heavy gas oils and hydrotreated residua.

Any suitable reactor can be used for the catalytic cracking process of this invention. Generally, a fluidized-bed catalytic cracking (FCC) reactor (preferably containing one or more risers) or a moving-bed catalytic cracking reactor (e.g., a Thermofor catalytic cracker) is employed, preferably a FCC riser cracking unit. Examples of such FCC cracking units are described in U.S. Pat. Nos. 4,377,470 and 4,424,116. Generally, a catalyst regeneration unit (for removal of coke deposits) is combined with the FCC cracking unit, as is shown in the above-cited patents.

Specific operating conditions of the cracking operation depend greatly on the type of feed, the type and dimensions of the cracking reactor and the oil feed rate. Examples of operating conditions are described in the above-cited patents and in many other publications. In an FCC operation, generally the weight ratio of catalyst composition to oil feed (i.e., hydrocarbon-containing feed) ranges from about 2:1 to about 10:1, the contact time between oil feed and catalyst is in the range of from about 0.2 to about 2.0 seconds, and the cracking temperature is in the range of from about 800° to about 1200° F. Generally, steam is added with the oil feed to the FCC reactor so as to aid in the dispersion of the oil as droplets. Generally, the weight ratio of steam to oil feed is in the range of from about 0.05:1 to about 0.5:1.

The separation of the thus used cracking catalyst composition from gaseous and liquid cracked products and the separation of cracking products into various gaseous and liquid product fractions can be carried out by any conventional separation means. The most desirable product fraction is gasoline (ASTM boiling range: about 180°–400° F.). Non-limiting examples of such separation schemes are shown in "Petroleum Refining" by James H. Gary and Glenn E. Handwerk, Marcel Dekker, Inc., 1975.

Generally, the separated, used cracking catalysts are regenerated, preferably by steam stripping for removal of adhered oil and subsequent heating under oxidizing conditions so as to burn off carbon deposits. At least a portion of the regenerated cracking catalyst composition can then be treated by the reactivation process of this invention, and thereafter be recycled to the catalytic cracking reactor, generally in admixture with fresh (unused) cracking catalyst.

The following examples are presented to further illustrate this invention and are not to be considered as unduly limiting the scope of this invention.

EXAMPLE I

This example illustrates the reactivating treatment of a metal-contaminated equilibrium cracking catalyst composition with various acid solutions. This zeolite-containing equilibrium catalytic cracking composition was a blend of fresh cracking catalyst and of spent cracking catalyst (having been used and regenerated in a FCC cracking operation at a refinery of Phillips Petroleum Company). This equilibrium catalyst composition (labeled "J-8802") contained about 10 weight-% zeolite, which was embedded in a silica-alumina matrix, 0.18 weight-% Ni, 0.32 weight-% V, 0.53 weight-% Fe, 0.01 weight-% Cu, 0.06 weight-% Sb, and 0.34 weight-% Na. "J-8802" had a surface area of about 110 m$^2$/g, a total pore volume of 0.18 cc/g, an apparent bulk density of 0.90 g/cc, and a zeolite unit cell size of 24.36 Å.

Catalyst A was prepared by heating 100 grams of J-8802 with 1500 cc of a 0.1 molar aqueous solution of hydrochloric acid under reflux conditions for about 1 hour. The thus-treated catalyst was separated from the acid solution by filtration, washed with water, and dried for about 16 hours at 120° C. About 11% of nickel and 29% of vanadium present in J-8802 were removed by this treatment with aqueous HCl.

Catalyst B was prepared by heating 100 grams of J-8802 with 1500 cc of a 0.1 molar aqueous solution of nitric acid under reflux conditions for about 1 hour, followed by filtering, washing and drying as described for Catalyst A. About 9% of nickel and 20% of vanadium present in J-8802 were removed by this treatment with aqueous HNO$_3$.

Catalyst C was prepared by heating 100 grams of J-8802 with 1780 cc of a an aqueous solution of formic acid having a pH of 2.0 under reflux conditions for about 1 hour, followed by filtering, washing and drying as described for Catalyst A. 3% of nickel and 17% of vanadium contained in J-8802 were removed by this treatment with formic acid.

Catalyst D was prepared in accordance with the procedure for Catalyst C except that acetic acid was used in lieu of formic acid. 3% of nickel and 24% of vanadium contained in J-8802 were removed by this treatment with acetic acid.

Catalyst E was prepared in accordance with the procedure for Catalyst C except that citric acid was used in lieu of formic acid. Nickel/vanadium removal was not determined.

Catalyst F was prepared in accordance with the procedure for Catalyst C except that lactic acid was used in lieu of formic acid 6% of nickel and 44% of vanadium contained in J-8802 were removed by this treatment with lactic acid.

EXAMPLE II

This example illustrates the performance of the acid-treated cracking catalysts described in Example I in a catalytic cracking test reactor.

The test reactor was a MCBU (microconfined bed unit) cracking test reactor, substantially in accordance with the procedure of Example II of U.S. Pat. No. 4,794,095. Cracking test conditions comprised a temperature of about 950° F., a catalyst to oil weight ratio of 6:1, and the use of a hydrotreated residuum as oil feed having API gravity (at 60° F.) of 18.7, sulfur content of 0.53 weight-%, basic nitrogen content of 0.09 weight-%, Conradson carbon content of 6.7 weight-%, nickel content of 10.6 ppm and vanadium content of 12.7 ppm. Average test results of at least two duplicate runs for each catalyst are summarized in Table I.

TABLE I

| Catalyst | Average Conversion (Wt-% of Feed) | Average Gasoline Yield[1] | Average Hydrogen Generation[2] |
|---|---|---|---|
| J-8802 (Base Catalyst) | 76.2 | 50.0 | 398 |
| A | 81.5 | 51.4 | 404 |
| B | 81.3 | 51.5 | 408 |
| C | 80.2 | 51.7 | 335 |
| D | 80.8 | 53.5 | 294 |
| E | 81.6 | 52.0 | 320 |
| F | 80.9 | 53.1 | 253 |

[1] weight-% of converted feed
[2] standard cubic feet H$_2$ per barrel of converted feed.

Test data in Table I show that treatment of a metal-contaminated cracking catalyst with carboxylic acid solutions (Invention Catalysts C through F) was more effective, in terms of increasing gasoline yield and lowering hydrogen generation, than treatment with mineral acid solutions (HCl and HNO$_3$; Catalysts A and B). These results are quite surprising because the carboxylic acids removed less nickel (the main "culprit") than the mineral acids (see Example I).

EXAMPLE III

Additional cracking tests were carried out with carboxylic acid treated equilibrium catalyst J-8802 (see Example I), at a catalyst to oil weight ratio of 7:1 (using the test procedure described in Example II). 500 grams of J-8802 were refluxed for 2 hours with aqueous solution of formic acid, acetic acid, citric acid and lactic acid, respectively, all having a pH of about 1. The thus treated catalyst samples were filtered, washed with 1500 cc tap water and dried at 120° C. Cracking test results, summarized in Table II, confirm the beneficial effects of carboxylic acid treatment of metal-contaminated cracking catalysts.

TABLE II

| Acid Used For Catalyst Treatment | Conversion (Wt % of Feed) | Gasoline Yield[1] | Coke Yield[1] | Hydrogen Generation[2] |
|---|---|---|---|---|
| None (J-8802) | 75.6 | 50.1 | 12.8 | 336 |
|  | 75.7 | 49.4 | 14.0 | 350 |
|  | 75.0 | 49.4 | 13.1 | 351 |
|  | 74.9 | 48.3 | 13.8 | 386 |
|  | 75.0 | 49.0 | 13.6 | 349 |
|  | 76.5 | 49.9 | 13.7 | 362 |
|  | 77.0 | 49.5 | 14.6 | 352 |
|  | 76.6 | 49.4 | 14.1 | 365 |
|  | 76.8 | 50.2 | 13.5 | 361 |
|  | 76.7 | 50.2 | 13.7 | 339 |
| Average: | 76.0 | 49.5 | 13.7 | 355 |
| Formic Acid | 82.8 | 52.8 | 14.4 | 256 |
|  | 81.9 | 51.8 | 14.4 | 262 |
|  | 82.0 | 53.0 | 13.5 | 251 |
| Average: | 82.2 | 52.5 | 14.1 | 256 |
| Acetic Acid | 79.1 | 50.9 | 13.7 | 286 |
|  | 80.4 | 52.6 | 13.5 | 266 |
|  | 79.6 | 52.6 | 13.2 | 279 |
| Average: | 79.7 | 52.0 | 13.5 | 277 |
| Citric Acid | 80.4 | 51.4 | 13.1 | 313 |
|  | 80.2 | 51.8 | 13.8 | 323 |
|  | 80.5 | 52.8 | 12.8 | 326 |
| Average: | 80.4 | 52.0 | 13.2 | 321 |
| Lactic Acid | 83.0 | 51.9 | 14.3 | 301 |
|  | 82.1 | 51.9 | 14.0 | 321 |
|  | 81.8 | 51.5 | 14.3 | 327 |
| Average: | 82.3 | 51.8 | 14.2 | 316 |

[1] weight-% of converted feed
[2] standard cubic feet per barrel of converted feed Preliminary test results (not described in detail herein) indicated that the octane number of gasoline produced by the carboxylic acid treated catalysts was higher than gasoline produced by the untreated base catalyst. Further preliminary test results (not described herein) indicated that the activity of a lactic acid treated spent catalyst decreased less with time (over a period of about 5 days) than a critic acid treated catalyst. Thus, lactic acid is presently considered a more preferred acidic treating agent.

EXAMPLE IV

This example illustrates the effect of the impregnation of carboxylic acid treated catalysts with an antimony compound. Samples weighting about 38 g of dried, carboxylic acid treated equilibrium catalyst J-8802 (described in Example III) were impregnated with about 19 cc of a mixture of 100 cc water and 1.0 gram of Phil-Ad CA 6000 (an aqueous dispersion of $Sb_2O_5$, containing 20 weight-% Sb; marketed by Catalyst Resources, Inc, Pasadena, Tex.). The antimony-impregnated catalyst samples were dried at about 248° F. and calcined in air for about 1 hour at 1250° F. These thus-reactivated catalysts contained about 1600 ppm (parts per million parts of catalyst by weight) Sb, based on the weight of the entire catalyst. They were tested for cracking performance in accordance with the procedure described in Example II, except that the catalyst to oil weitht ratio was 7:1. Test results (average of two or more runs) are summarized in Table III.

TABLE III

| Catalyst Treatment | Average Conversion (Wt-% of Feed) | Average Gasoline Yield[1] | Average Coke Yield[1] | Average Hydrogen Generation[2] | Average Reduction in $H_2$ Generation[3] |
|---|---|---|---|---|---|
| None (J-8802) | 76.0 | 49.5 | 13.7 | 355 | — |
| J-8802 + Formic Acid | 82.2 | 52.5 | 14.1 | 256 | −28% |
| J-8802 + Acetic Acid | 79.7 | 52.0 | 13.5 | 277 | −22% |
| J-8802 + Citric Acid | 80.4 | 52.0 | 13.2 | 321 | −10% |
| J-8802 + Lactic Acid | 82.3 | 51.8 | 14.2 | 316 | −11% |
| J-8802 + Sb | 76.1 | 50.2 | 13.4 | 292 | −18% |
| J-8802 + Formic Acid + Sb | 81.9 | 52.3 | 13.9 | 193 | −46% |
| J-8802 + Acetic Acid + Sb | 79.4 | 52.5 | 12.8 | 209 | −41% |
| J-8802 + Citric Acid + Sb | 81.3 | 53.2 | 12.7 | 171 | −52% |
| J-8802 + Lactic Acid + Sb | 82.9 | 51.7 | 14.6 | 165 | −54% |

[1] weight-% of converted feed
[2] standard cubic feet per barrel of converted feed
[3] as compared to untreated J-8802 equilibrium catalyst Test data in Table III clearly show that the antimony impregnation after carboxylic acid treatment resulted in an additional reduction of undesirable hydrogen generation. In particular for the citric acid and lactic acid treated catalysts, the reduction in hydrogen generation was significantly higher than would have been expected from the effect of acid treatment alone (10–11% reduction) and antimony impregnation alone (18% reduction).

EXAMPLE V

This example illustrates the effect of the impregnation of a carboxylic acid treated equilibrium catalyst J-8802 (described in Example III) with passivating agents other than antimony compounds, substantially in accordance with the procedure described in Example IV, except that passivating agents other than Sb compounds were used. Generally the passivating element (i.e., Bi or In or P or Sn or Te) was incorporated into the acid-treated equilibrium catalyst at a level of about 1500–2000 ppm. Cracking test results (average of two or more runs; carried out in accordance with the procedure described in Example IV), which are summarized in Table IV, show the effectiveness (in terms of further reduction of $H_2$ generation) of various passivating agents in combination with a specific acid treatment.

TABLE IV

| Catalyst Treatment | Average Conversion (Wt-% of Feed) | Average Gasoline Yield[1] | Average Coke Yield[1] | Average Hydrogen Generation[2] |
|---|---|---|---|---|
| J-8802 + Acetic Acid | 79.7 | 52.0 | 13.5 | 277 |
| J-8802 + Acetic Acid + Sn[3] | 80.4 | 52.9 | 13.1 | 234 |
| J-8802 + Citric Acid | 80.4 | 52.0 | 13.2 | 321 |
| J-8802 + Citric Acid + Sn[3] | 82.5 | 52.9 | 13.3 | 215 |
| J-8802 + Citric Acid + Bi[4] | 80.4 | 50.9 | 14.1 | 290 |
| J-8802 + Citric Acid + In[5] | 82.2 | 52.4 | 14.0 | 252 |
| J-8802 + Citric Acid + P[6] | 80.7 | 51.5 | 14.1 | 309 |
| J-8802 + Citric Acid + Te[7] | 82.6 | 52.8 | 14.3 | 249 |
| J-8802 + Lactic Acid | 82.3 | 51.8 | 14.2 | 316 |
| J-8802 + Lactic Acid + Bi[4] | 82.0 | 51.5 | 15.0 | 276 |
| J-8802 + Lactic Acid + P[6] | 82.8 | 51.5 | 14.7 | 274 |

[1] weight-% of converted feed
[2] standard cubic feet per barrel of converted feed
[3] applied as tetra(n-butyl)tin, dissolved in n-heptane
[4] applied as bismuth octanoate, dissolved in toluene
[5] applied as indium nitrate, dissolved in water
[6] applied as p-tolydiphenyl phosphine, dissolved in toluene
[7] applied as tellurium tetrabromide, dissolved in ethanol Reasonable variations, modifications and adaptations for various conditions and uses can be made within the scope of the disclosure and appended claims.

That which is claimed is:

1. A catalyst reactivation process comprising the steps of:
   (a) contacting a spent zeolite-containing catalytic cracking catalyst composition which contains at least one metal contaminant with an acid solution consisting essentially of water and at least one carboxylic acid selected from the group consisting of formic acid, acetic acid, citric acid and lactic acid;
   (b) at least partially separating the acid-treated catalyst composition obtained in step (a) from the acid solution used in step (a);
   (c) drying the at least partially separated catalyst composition obtained in step (b); and
   (d) contacting the dried catalyst composition obtained in step (c) with a solution comprising at least one antimony compound;
   wherein said catalyst reactivation process is carried out under such conditions as to obtain a reactivated cracking catalyst composition exhibiting higher cracking activity and lower hydrogen generation than said spent zeolite-containing catalytic cracking catalyst composition, as determined during catalytic cracking of a hydrocarbon-containing oil in the substantial absence of added hydrogen gas.

2. A process in accordance with claim 1, wherein said at least one metal contaminant contained in said spent catalytic cracking catalyst composition is selected from the group consisting of compounds of nickel, vanadium, iron and copper.

3. A process in accordance with claim 1, wherein the pH of said acid solution used in step (a) is about 0.5-2.

4. A process in accordance with claim 1, wherein said at least one carboxylic acid is formic acid.

5. A process in accordance with claim 1, wherein said at least one carboxylic acid is acetic acid.

6. A process in accordance with claim 1, wherein said at least one carboxylic acid is citric acid.

7. A process in accordance with claim 1, wherein said at least one carboxylic acid is lactic acid.

8. A process in accordance with claim 1, wherein in step (a) the weight ratio of said acid solution to said spent zeolite-containing catalytic cracking catalyst composition is in the range of about 2:1 to about 100:1.

9. A process in accordance with claim 1 comprising the additional step of washing said at least partially separated catalytic cracking catalyst composition with water before step (c).

10. A process in accordance with claim 1, wherein step (d) is carried out under such conditions as to incorporate about 0.01 to about 5 weight-% antimony into said reactivated cracking catalyst composition.

11. A catalyst reactivation process comprising the steps of:
   (a) contacting a spent zeolite-containing catalytic cracking catalyst composition which contains at least one metal contaminant with an acid solution consisting essentially of water and acetic acid;
   (b) at least partially separating the acid-treated catalyst composition obtained in step (a) from the acid solution used in step (a);
   (c) drying the at least partially separated catalyst composition obtained in step (b); and
   (d) contacting the dried catalyst composition obtained in step (c) with a solution comprising at least one tin compound;
   wherein said catalyst reactivation process is carried out under such conditions as to obtain a reactivated cracking catalyst composition exhibiting higher cracking activity and lower hydrocarbon generation than said spent zeolite-containing catalytic cracking catalyst composition, as determined during catalytic cracking of a hydrocarbon-containing oil in the substantial absence of added hydrogen gas.

12. A process in accordance with claim 11, wherein said at least one metal contaminant contained in said spent catalytic cracking catalyst composition is selected from the group consisting of compounds of nickel, vanadium, iron and copper.

13. A process in accordance with claim 11, wherein pH of said acid solution used in step (a) is about 0.5-2.

14. A process in accordance with claim 11, wherein in step (a) the weight ratio of said acid solution to said spent zeolite-containing catalytic cracking catalyst composition is in the range of about 2:1 to about 100:1.

15. A process in accordance with claim 11 comprising the additional step of washing said at least partially separated catalytic cracking catalyst composition with water before step (c).

16. A process in accordance with claim 11, wherein step (d) is carried out under such conditions as to incorporate about 0.01 to about 5 weight-% tin into said reactivated cracking catalyst composition.

17. A reactivated zeolite-containing catalytic cracking catalyst composition obtained by the process of claim 11.

18. A catalyst reactivation process comprising the steps of:
(a) contacting a spent zeolite-containing catalytic cracking catalyst composition which contains at least one metal contaminant with an acid solution consisting essentially of water and lactic acid;
(b) at least partially separating the acid-treated catalyst composition obtained in step (a) from the acid solution used in step (a);
(c) drying the at least partially separated catalyst composition obtained in step (b); and
(d) contacting the dried catalyst composition obtained in step (c) with at least one passivating agent selected from the group consisting of bismuth compounds and phosphorus compounds;
wherein said catalyst reactivation process is carried out under such conditions as to obtain a reactivated cracking catalyst composition exhibiting higher cracking activity and lower hydrogen generation than said spent zeolite-containing catalytic cracking catalyst composition, as determined during catalytic cracking of a hydrocarbon-containing oil in the substantial absence of added hydrogen gas.

19. A process in accordance with claim 18, wherein said at least one metal contaminant contained in said spent catalytic cracking catalyst composition is selected from the group consisting of compounds of nickel, vanadium, iron and copper.

20. A process in accordance with claim 18, wherein the pH of said acid solution used in step (a) is about 0.5-2.

21. A process in accordance with claim 18, wherein in step (a) the weight ratio of said acid solution to said spent zeolite-containing catalytic cracking catalyst composition is in the range of about 2:1 to about 100:1.

22. A process in accordance with claim 18 comprising the additional step of washing said at least partially separated catalytic cracking catalyst composition with water before step (c).

23. A process in accordance with claim 18, wherein step (d) is carried out under such conditions as to incorporate about 0.01 to about 5 weight-% bismuth into said reactivated cracking catalyst composition.

24. A process in accordance with claim 18, wherein step (d) is carried out under such conditions as to incorporate about 0.01 to about 5 weight-% phosphorus into said reactivated cracking catalyst composition.

25. A reactivated zeolite-containing catalytic cracking catalyst composition obtained by the process of claim 18.

26. A catalyst reactivation process comprising the steps of:
(a) contacting a spent zeolite-containing catalytic cracking composition which contains at least one metal contaminant with an acid solution consisting essentially of water and citric acid;
(b) at least partially separating the acid-treated catalyst composition obtained in step (a) from the acid solution used in step (a);
(c) drying the at least partially separated catalyst composition obtained in step (b); and
(d) contacting the dried catalyst composition obtained in step (c) with a solution comprising at least one passivating agent selected from the group consisting of bismuth compounds, indium compounds, phosphorus compounds, tellurium compounds and tin compounds;
wherein said catalyst reactivation process is carried out under such conditions as to obtain a reactivated cracking catalyst composition exhibiting higher cracking activity and lower hydrogen generation than said spent zeolite-containing catalytic cracking catalyst composition, as determined during catalytic cracking of a hydrocarbon-containing oil in the substantial absence of added hydrogen gas.

27. A process in accordance with claim 26, wherein said at least one metal contaminant contained in said spent catalytic cracking catalyst composition is selected from the group consisting of compounds of nickel, vanadium, iron and copper.

28. A process in accordance with claim 26, wherein the pH of said acid solution used in step (a) is about 0.5-2.

29. A process in accordance with claim 26, wherein in step (a) the weight ratio of said acid solution to said spent zeolite-containing catalytic cracking catalyst composition is in the range of about 2:1 to about 100:1.

30. A process in accordance with claim 26 comprising the additional step of washing said at least partially separated catalytic cracking catalyst composition with water before step (c).

31. A process in accordance with claim 26, wherein step (d) is carried out under such conditions as to incorporate about 0.01 to about 5 weight-% bismuth into said reactivated cracking catalyst composition.

32. A process in accordance with claim 26, wherein step (d) is carried out under such conditions as to incorporate about 0.01 to about 5 weight-% indium into said reactivated cracking catalyst composition.

33. A process in accordance with claim 26, wherein step (d) is carried out under such conditions as to incorporate 0.01 to about 5 weight-% phosphorus into said reactivated cracking catalyst composition.

34. A process in accordance with claim 26, wherein step (d) is carried out under such conditions as to incorporate about 0.01 to about 5 weight-% tellurium into said reactivated cracking catalyst composition.

35. A process in accordance with claim 26, wherein step (d) is carried out under such conditions as to incorporate about 0.01 to about 5 weight-% tin into said reactivated cracking catalyst composition.

36. A reactivated zeolite-containing catalytic cracking catalyst composition obtained by the process of claim 26.

* * * * *